United States Patent
Liang et al.

(10) Patent No.: US 9,040,847 B2
(45) Date of Patent: May 26, 2015

(54) FASTENING MECHANISM AND ELECTRONIC DEVICE HAVING THE SAME

(75) Inventors: Chen-Yi Liang, New Taipei (TW); Hung-Chih Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 198 days.

(21) Appl. No.: 13/556,922

(22) Filed: Jul. 24, 2012

(65) Prior Publication Data

US 2013/0037295 A1    Feb. 14, 2013

(30) Foreign Application Priority Data

Aug. 12, 2011    (TW) .............................. 100128897 A

(51) Int. Cl.
  *H02B 1/015*    (2006.01)
  *G06F 1/16*    (2006.01)

(52) U.S. Cl.
  CPC ............. *G06F 1/1626* (2013.01); *Y10T 403/60* (2015.01); *G06F 1/1633* (2013.01)

(58) Field of Classification Search
  CPC ....... G06F 1/181; G06F 1/183; G06F 1/1613; G06F 1/1615; G06F 1/1616; G06F 1/1641; G06F 1/1647; G06F 1/1675; G06F 1/1677; G06F 1/1679; H05K 7/1422
  USPC ........... 174/500; 361/679.01, 679.02, 679.21, 361/679.26, 679.27, 679.28, 679.3, 679.56, 361/679.57, 679.58
  See application file for complete search history.

(56) References Cited

U.S. PATENT DOCUMENTS

| 6,762,928 | B2 | 7/2004 | Lo |
| 7,420,799 | B2 | 9/2008 | Wang |
| 8,102,645 | B2 | 1/2012 | Zhang |
| 2005/0180562 | A1 | 8/2005 | Chiang |
| 2006/0133023 | A1 | 6/2006 | Chen et al. |
| 2008/0084994 | A1 | 4/2008 | Chuang |
| 2011/0188223 | A1* | 8/2011 | Zhang ........................ 361/807 |

FOREIGN PATENT DOCUMENTS

| CN | 2569211 Y | 8/2003 |
| CN | 2747614 Y | 12/2005 |
| CN | 2891045 Y | 4/2007 |
| CN | 102143664 A | 8/2011 |
| TW | M290365 | 5/2006 |

(Continued)

OTHER PUBLICATIONS

Chinese Office Action for Corresponding Chinese Application No. 201110254253.8.

(Continued)

*Primary Examiner* — Tremesha S Willis
(74) *Attorney, Agent, or Firm* — Dickstein Shapiro LLP

(57) ABSTRACT

A fastening mechanism for an electronic device, which has a shell body and a cover having a first fastening structure, includes a press portion adapted to be exposed from the shell body and pressable to extend resiliently into the shell body, and a second fastening structure adapted to engage to and disengage from the first fastening structure to prevent and permit removal of the cover from the shell body, respectively. A resilient component is adapted to be provided in the shell body, stores a restoring force when the cover is coupled to the shell body, and releases the restoring force when the second fastening structure is disengaged from the first fastening structure for biasing the cover away from the shell body.

12 Claims, 13 Drawing Sheets

(56) References Cited

FOREIGN PATENT DOCUMENTS

| TW | 200712838 A | 4/2007 |
|---|---|---|
| TW | I295916 | 4/2008 |

OTHER PUBLICATIONS

Taiwanese Office Action for Taiwanese Counterpart Application No. 100128897.

* cited by examiner

FASTENING MECHANISM AND ELECTRONIC DEVICE HAVING THE SAME

CROSS REFERENCE TO RELATED APPLICATION

This application claims priority of Taiwanese Patent Application No. 100128897, filed on Aug. 12, 2011, the disclosure of which is incorporated herein by reference.

BACKGROUND OF THE INVENTION

1. Field of the Invention

The invention relates to a fastening mechanism, more particularly to a fastening mechanism for easy removal of a casing and an electronic device having the same.

2. Description of the Related Art

Currently, 3C products in the market, apart from having greater efficiencies, have also been improving the appearance of their designs. In particular, more and more customers tend to pursue products that can reflect their own personalities and products that can permit change in their appearance. For example, many mobile phones nowadays have replaceable casings.

Notebook computers have also catch up with this trend, and there are presented some models with replaceable casings. At present, a fastening mechanism includes two parts, one of which is used for fastening a decorative plate, and the other one of which is used for detaching the decorative plate. The fastening mechanism occupies a substantial space. Hence, the current development is to provide a fastening mechanism that can facilitate assembly and disassembly of the decorative plate and that does not occupy a substantial space.

SUMMARY OF THE INVENTION

Therefore, an object of the present invention is to provide a fastening mechanism that can facilitate replacement of a casing.

Another object of the present invention is to provide an electronic device having a fastening mechanism that can facilitate replacement of a casing.

According to one aspect of this invention, a fastening mechanism of the present invention is applied on an electronic device. The electronic device includes a shell body and a cover detachably coupled to the shell body. The cover has a first fastening structure. The fastening mechanism comprises a press unit and a resilient component. The press unit is adapted to be provided on the shell body and includes a press portion and a second fastening structure. The press portion is adapted to be exposed from the shell body, and is pressable to extend resiliently into the shell body to be disposed at a depressed state. The second fastening structure is fixed to the press portion, is adapted to engage to the first fastening structure when the cover is coupled to the shell body to prevent removal of the cover from the shell body, and is adapted to disengage from the first fastening structure when the press portion is depressed to permit removal of the cover from the shell body. The resilient component is adapted to be provided in the shell body. The resilient component stores a restoring force when the cover is coupled to the shell body, and releases the restoring force when the second fastening structure is disengaged from the first fastening structure for biasing the cover away from the shell body.

Preferably, the resilient component is a resilient plate, and includes a fixed plate portion adapted to be fixed to the shell body, and a movable plate portion that is resiliently deformable relative to the fixed plate portion for biasing the cover away from the shell body.

The first fastening structure is configured as a bracket defining an engaging hole. Preferably, the second fastening structure includes a U-shaped connecting portion fixed to the press portion, and a hook portion located at the center of the connecting portion. The hook portion is adapted to engage the engaging hole when the cover is coupled to the shell body.

Preferably, the hook portion of the second fastening structure has an inclined guiding face adapted to face the cover. The inclined guiding face is adapted to be pushed by the first fastening structure when the cover is moved near the shell body so as to pull the press portion toward the depressed state.

The shell body includes a positioning plate formed with a positioning notch. Preferably, the press portion includes a press portion body adapted to be exposed from the shell body, a positioning stud extending from the press portion body into the positioning notch, and a compression spring sleeved on the positioning stud and disposed between the press portion body and the positioning plate to bias the press portion body away from the positioning plate.

The shell body further includes a pair of limiting members located in the connecting portion. Preferably, the connecting portion is adapted to be prevented by the limiting members from displacing in a direction perpendicular to a movement in the direction of the depressed state.

According to another aspect of this invention, an electronic device comprises a shell body, a cover detachably coupled to the shell body and having a first fastening structure, and a fastening mechanism including a press unit and a resilient component. The press unit is provided on the shell body, and includes a press portion and a second fastening structure. The press portion is exposed from the shell body and is pressable to extend resiliently into the shell body to be disposed at a depressed state. The second fastening structure is fixed to the press portion, is engaged to the first fastening structure when the cover is coupled to the shell body to prevent removal of the cover from the shell body, and is disengaged from the first fastening structure when the press portion is depressed to permit removal of the cover from the shell body. The resilient component is provided in the shell body. The resilient component stores a restoring force when the cover is coupled to the shell body, and releases the restoring force when the second fastening structure is disengaged from the first fastening structure to bias the cover away from the shell body.

Preferably, the resilient component is a resilient plate, and includes a fixed plate portion fixed to the shell body, and a movable plate portion that is resiliently deformable relative to the fixed plate portion to bias the cover away from the shell body.

Preferably, the second fastening structure includes a U-shaped connecting portion fixed to the press portion, and a hook portion located at the center of the connecting portion. The first fastening structure is configured as a bracket defining an engaging groove. The hook portion is engaged to the engaging hole when the cover is coupled to the shell body.

Preferably, the hook portion of the second fastening structure includes an inclined guiding face facing the cover. The inclined guiding face is pushed by the first fastening structure when the cover is moved near the shell body so as to pull the press portion toward the depressed state.

Preferably, the press portion includes a press portion body exposed from the shell body, a positioning stud extending from the press portion body into the shell body, and a compression spring sleeved on the positioning stud. The shell body includes a positioning plate formed with a positioning notch. The positioning stud extends into the positioning notch. The compression spring is disposed between the press portion body and the positioning plate to bias the press portion body away from the positioning plate.

Preferably, the shell body further includes a pair of limiting members located in the connecting portion. The limiting members prevent displacement of the connecting portion in a direction perpendicular to a movement in the direction of the depressed state.

The advantage of this invention resides in that by using the press unit and the resilient component of the fastening mechanism, the cover can be assembled directly to the shell body, and when replacement of the cover is desired, the press unit is simply depressed to detach the cover from the shell body. Therefore, the cover can be conveniently assembled to and disassembled from the shell body.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of an embodiment in coordination with the reference drawings.

Referring to FIGS. 1 to 5, an electronic device according to the embodiment of the present invention comprises a shell body 1, a fastening mechanism 2, and a cover 3.

Figure 3:
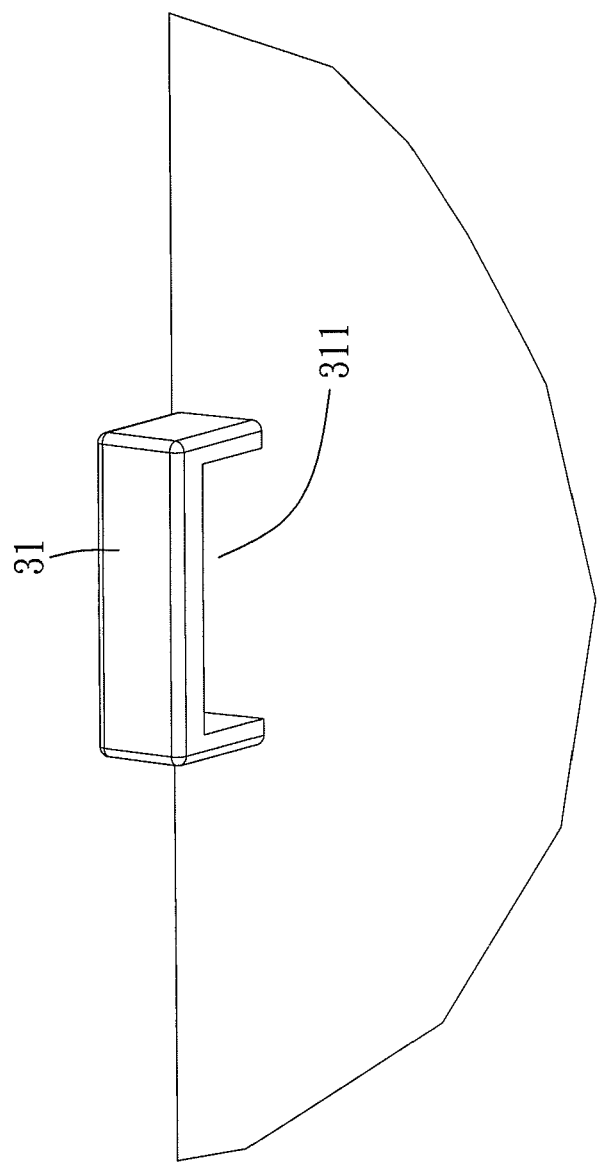
FIG. 3 is a fragmentary enlarged perspective view of FIG. 2, illustrating a first fastening structure of the embodiment.

In this embodiment, the shell body 1 is a back shell of a notebook computer display screen, and the cover 3 is detachably coupled to the shell body 1 to cover the same. That is, the shell body 1 and the cover 3 are a casing component of the display screen of the notebook computer. Alternatively, the shell body 1 and the cover 3 may also be a casing component of a main body of the notebook computer. The shell body 1 includes a plurality of spaced-apart hook grooves 12. The cover 3 has a first fastening structure 31 and a plurality of spaced-apart engaging hooks 32. The first fastening structure 31, as shown in FIG. 3, is configured as a U-shaped bracket connected to the cover 3 and defining an engaging hole 311. The engaging hooks 32 are engaged to the respective hook grooves 12 so as to connect the cover 3 to an outer side 10 of the shell body 1.

Referring to FIGS. 4 to 8, the fastening mechanism 2 includes a press unit 21 and a resilient component 22. The press unit 21 includes a press portion 211 and a second fastening structure 212. The press portion 211 includes a press portion body 213 exposed from a slot 141 in a sidewall 14 of the shell body 1, two spaced-apart positioning studs 214 extending symmetrically from the press portion body 213 into the shell body 1, and two compression springs 215 sleeved respectively on the positioning studs 214. The shell body 1 further includes two positioning plates 11 located at positions corresponding to the positioning studs 214. Each of the positioning plates 11 is formed with a positioning notch 111. Each positioning stud 214 extends movably into the positioning notch 111 of a respective positioning plate 11. Each compression spring 215 is disposed between and abuts against the press portion body 213 and a corresponding positioning plate 11.

Figure 6:
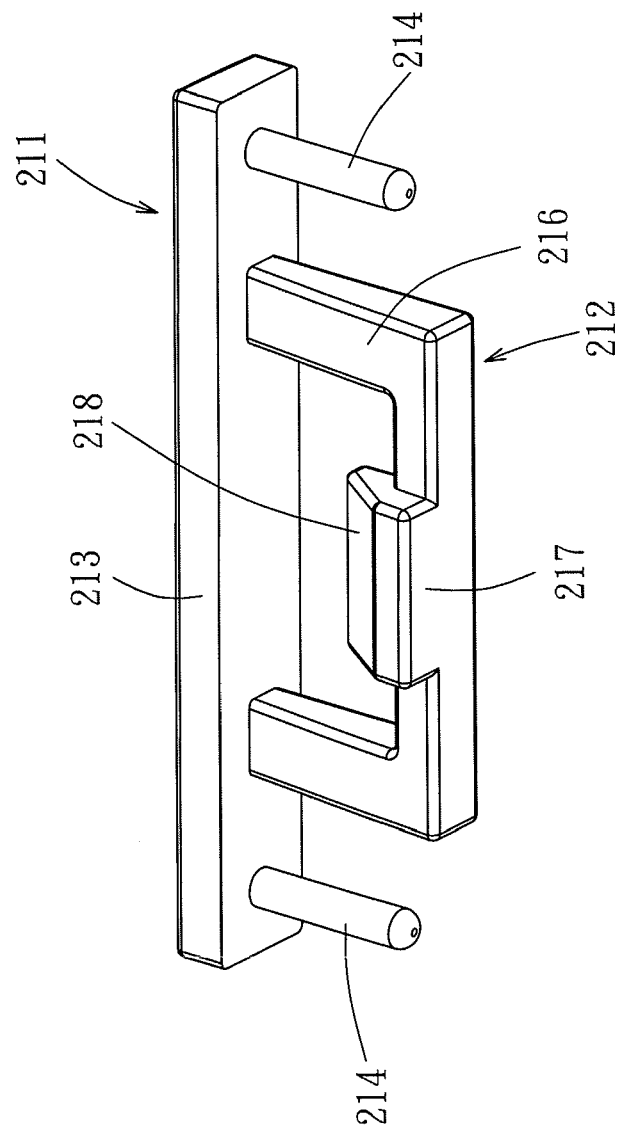
FIG. 6 is an enlarged perspective view of a press unit of the embodiment.

The second fastening structure 212 includes a U-shaped connecting portion 216 fixed to the press portion body 213, and a hook portion 217 located at the center of the connecting portion 216. With reference to FIG. 6, the second fastening structure 212, the press portion body 213 and the positioning studs 214 are connected integrally as one piece. The connecting portion 216 is disposed between the positioning studs 214. The hook portion 217 is configured as a protruding block that protrudes toward the press portion body 213 to engage releasably the engaging hole 311 of the first fastening structure 31, and has an inclined guiding face 218 facing the cover 3. The shell body 1 further includes a pair of spaced-apart limiting members 15 extending into the connecting portion 216. In this embodiment, the limiting members 15 are configured as engaging hooks that are hooked to the connecting portion 216 so as to prevent movement of the connecting portion 216 relative to the shell body 1 in a top-bottom direction.

Figure 9:
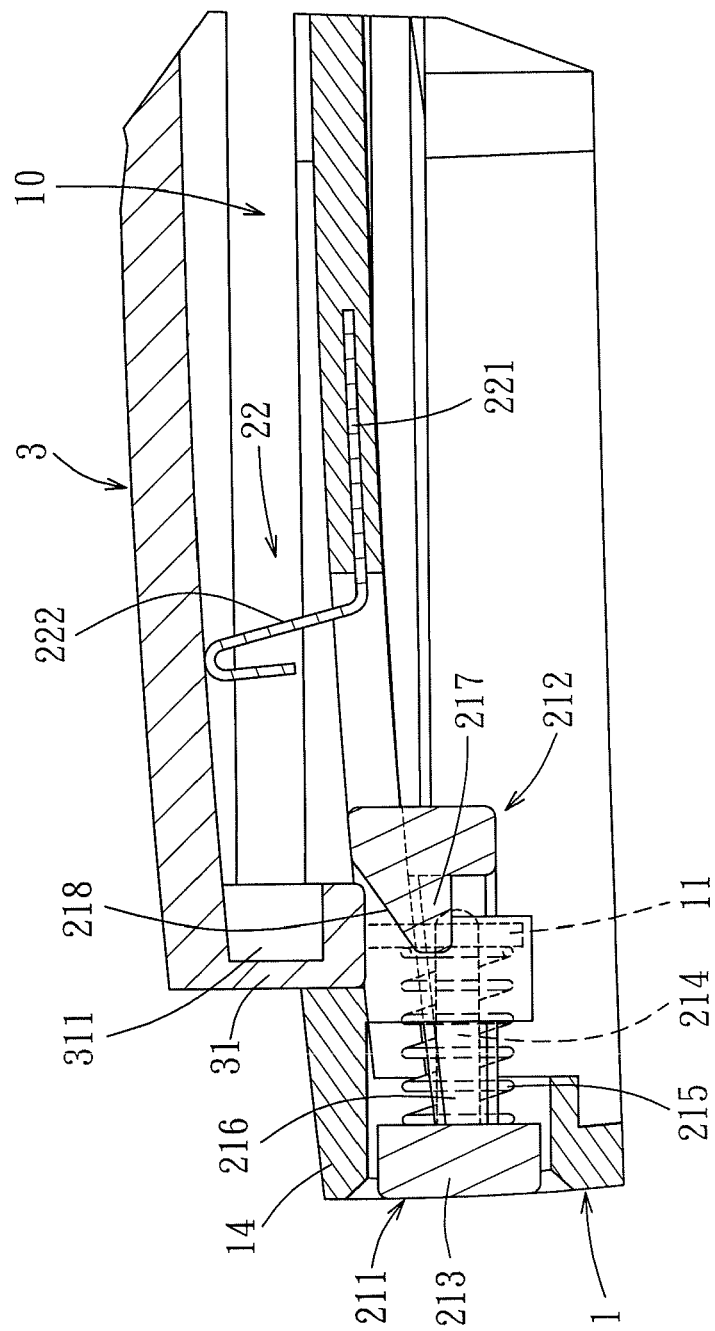
FIG. 9 is a sectional view of the embodiment taken along line IX-IX of FIG. 8.
Figure 11:
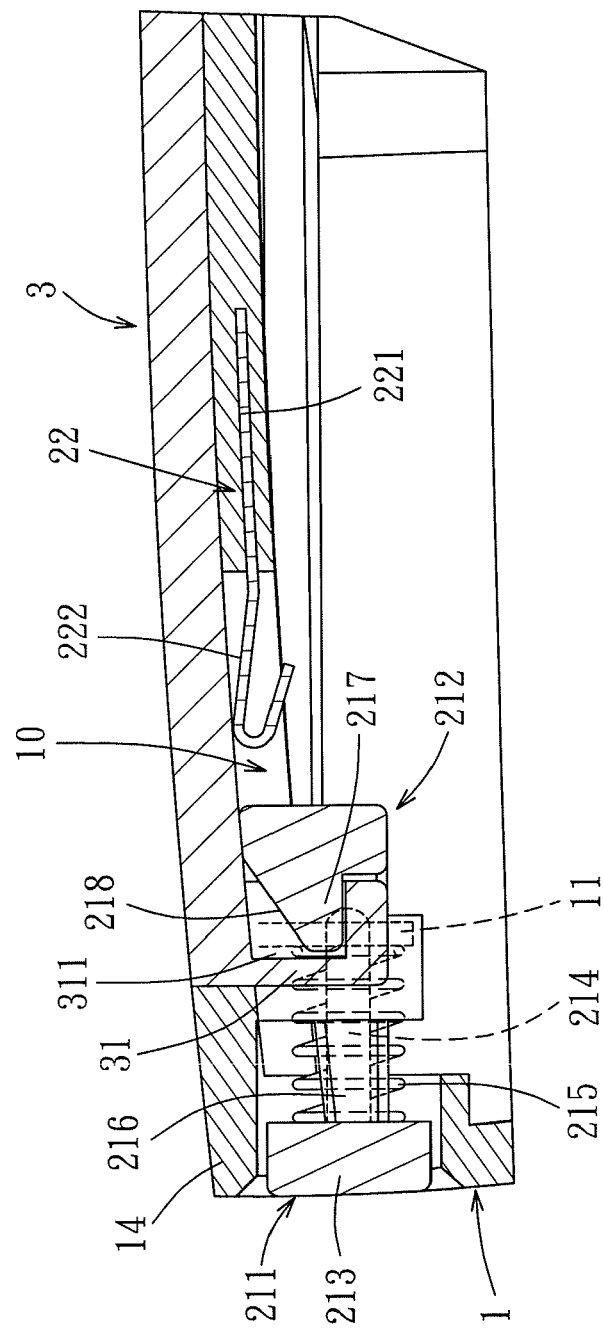
FIG. 11 is a view similar to FIG. 9, but illustrating the first fastening structure and the hook portion being engaged to each other.
Figure 12:
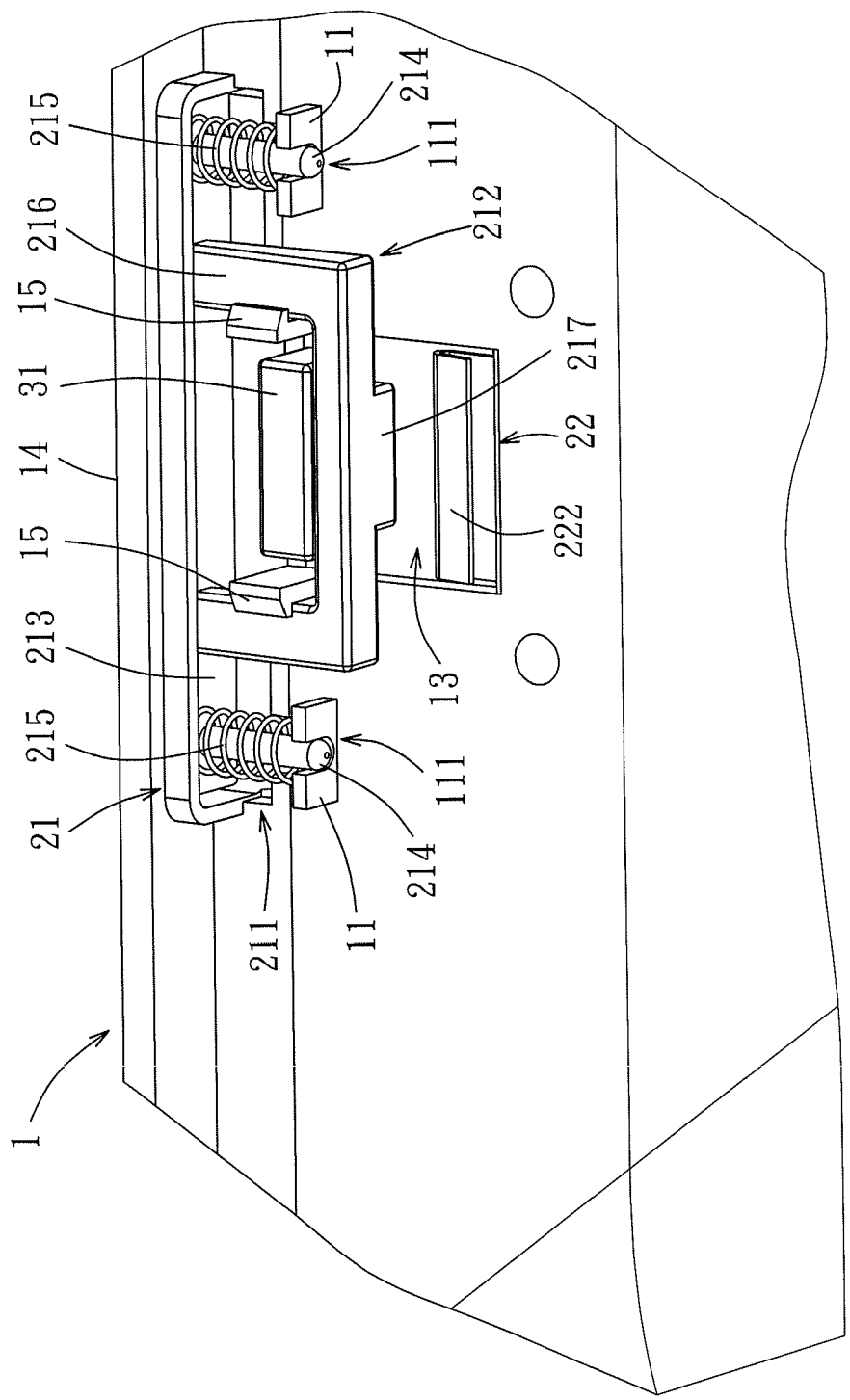
FIG. 12 is a fragmentary bottom perspective view of FIG. 11.

The resilient component 22 is configured as a resilient plate, and includes a fixed plate portion 221 fixed to the shell body 1, and a movable plate portion 222 that is resiliently deformable relative to the fixed plate portion 221. In this embodiment, when no external force is exerted on the resilient component 22, the movable plate portion 222 is in a substantially upright state relative to the fixed plate portion 221, as shown in FIG. 9. When an external force is exerted on the resilient component 22, the movable plate portion 222 is pushed to move gradually to a substantially flat state relative to the fixed plate portion 221, as shown in FIG. 11.

The shell body 1 further includes a through hole 13 extending through the outer side 10 thereof in proximity to the slot 141. When the press unit 21 is disposed on the shell body 1, the press portion body 213 is exposed from the sidewall 14 through the slot 141, and the hook portion 217 is registered with the through hole 13 and protrudes toward the outer side 10 of the shell body 1.

FIGS. 7 to 13 illustrate how the cover 3 can be assembled to and disassembled from the shell body 1.

Figure 1:
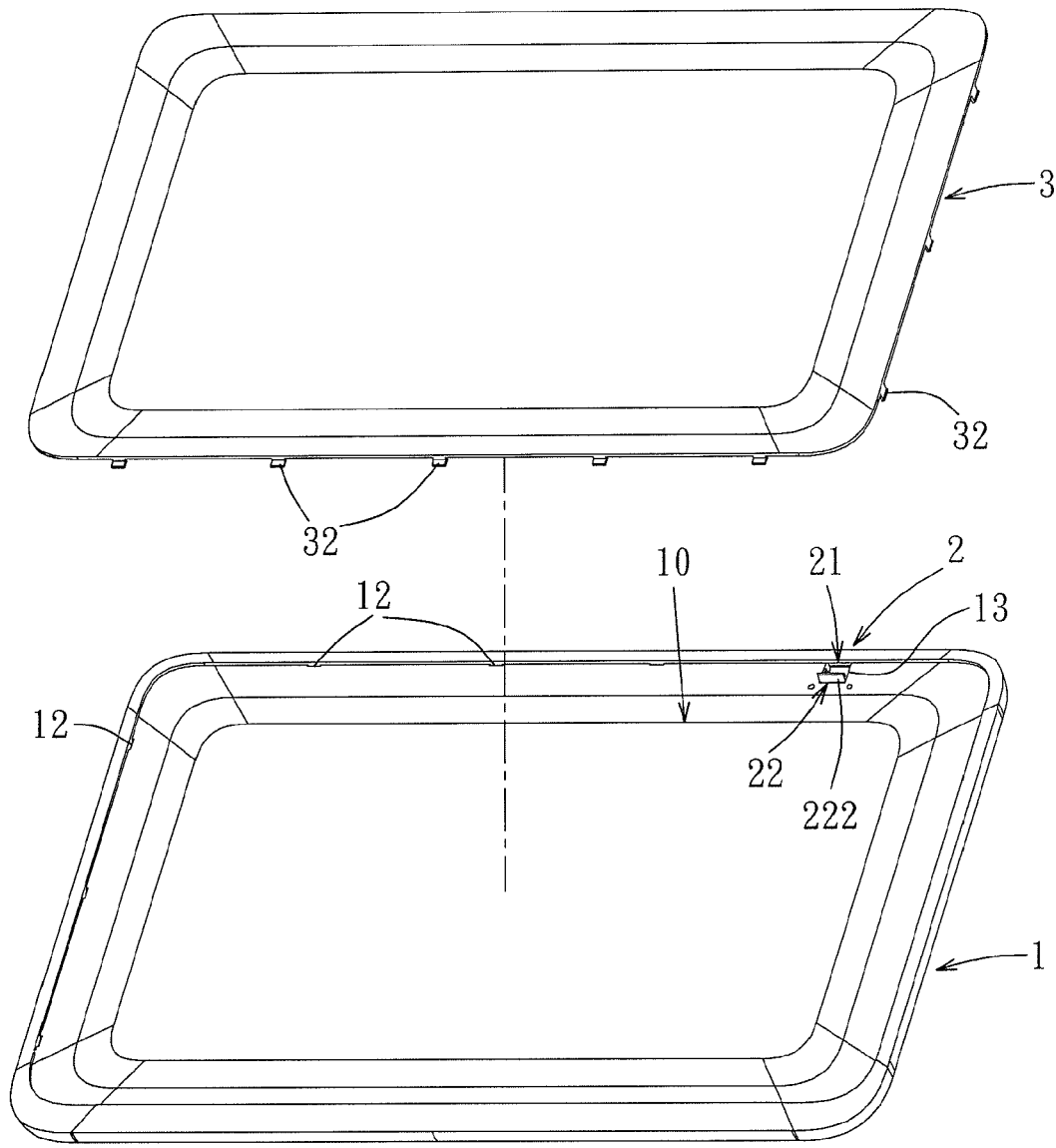
FIG. 1 is an exploded perspective view of a cover and a shell body of an electronic device according to the embodiment of the present invention.
Figure 2:
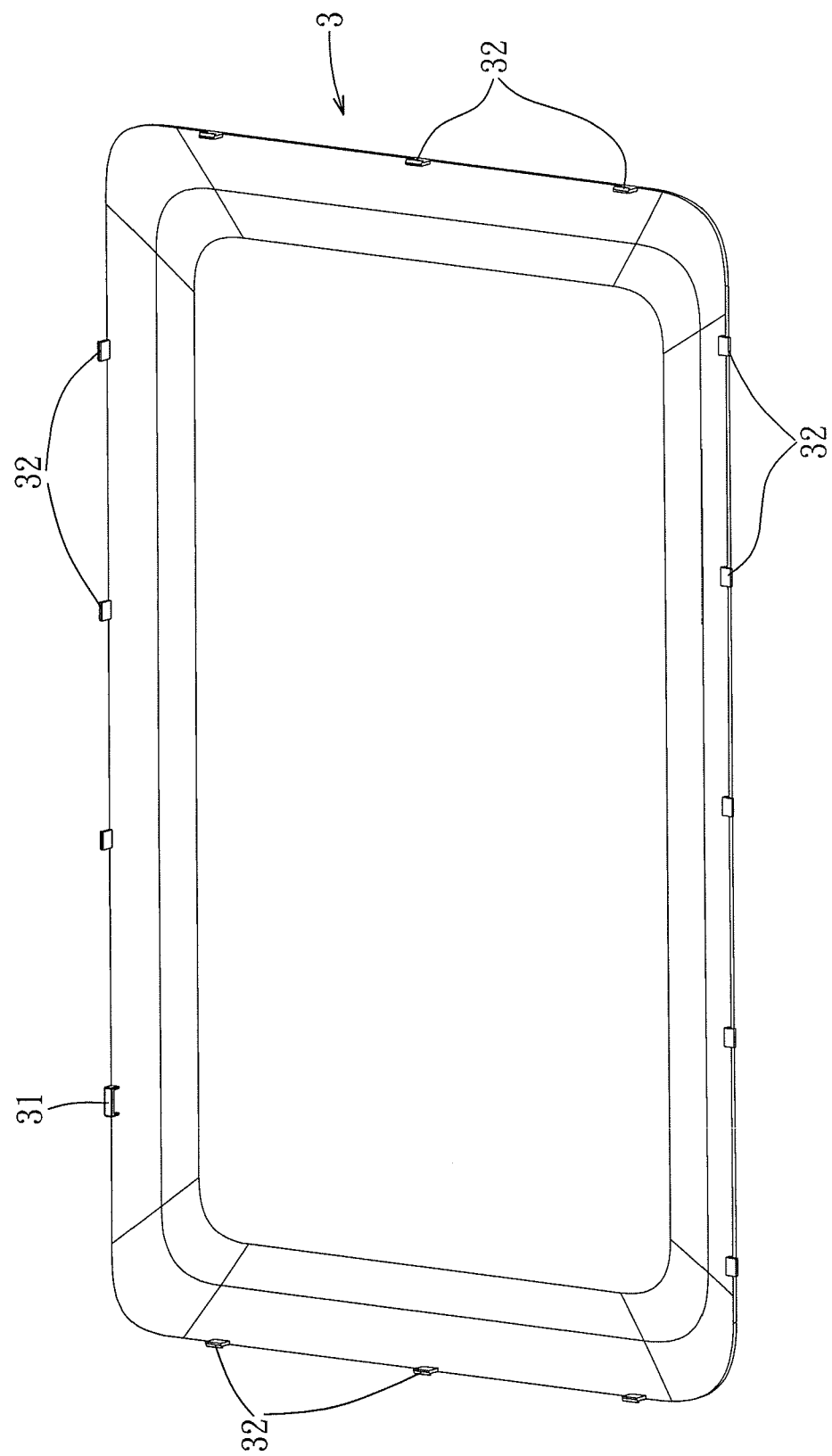
FIG. 2 is a perspective view of the cover of the embodiment.
Figure 7:
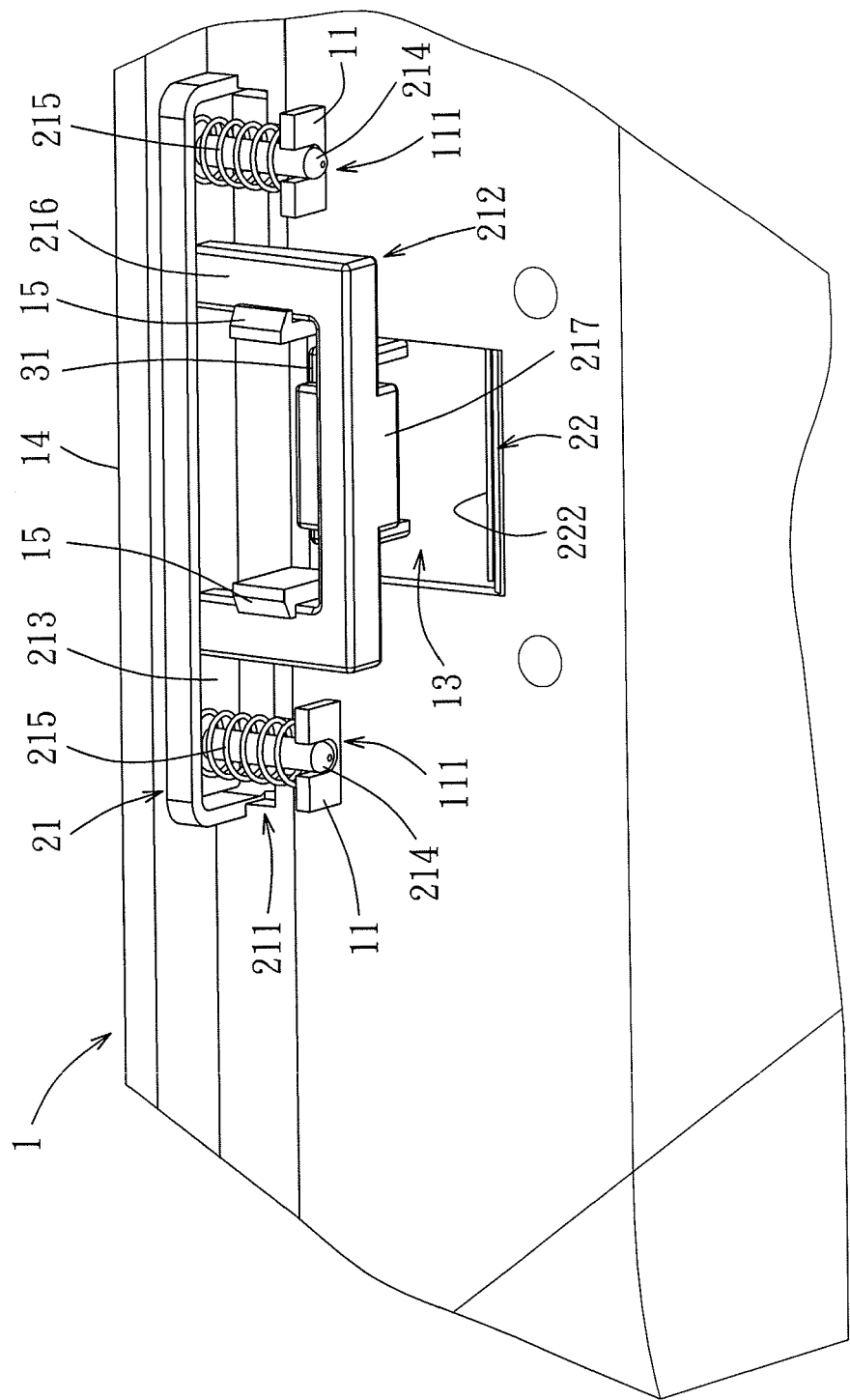
FIG. 7 is an enlarged fragmentary bottom perspective view of the embodiment.
Figure 8:
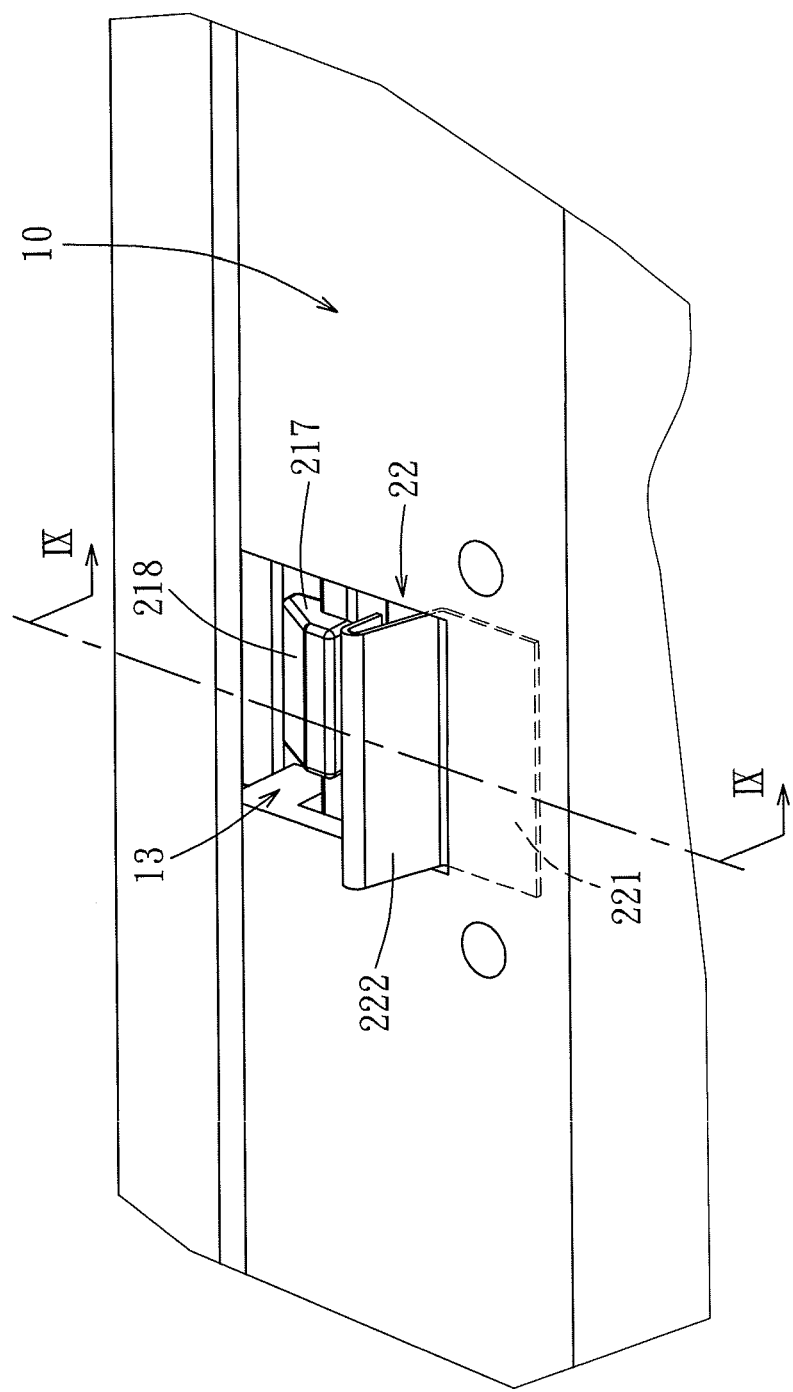
FIG. 8 is a fragmentary top perspective view of the shell body, illustrating how a movable plate portion of a resilient component extends out of an outer side of the shell body.
Figure 10:
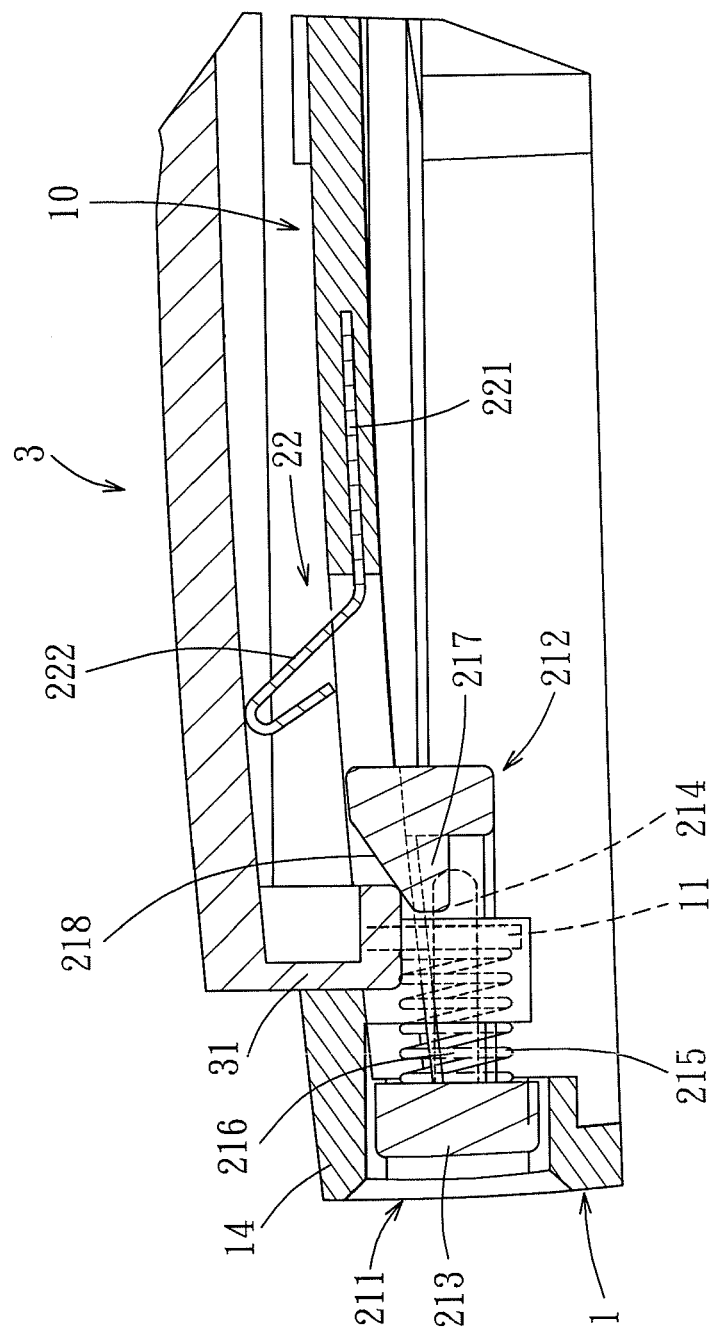
FIG. 10 is a view similar to FIG. 9, but illustrating the first fastening structure pushing against the hook portion of the press unit.

With reference to FIGS. 7 and 8, in combination with FIG. 1, prior to assembly of the cover 3 to the shell body 1, the movable plate portion 222 is disposed substantially upright relative to the fixed plate portion 221 and protrudes on the outer side 10 of the shell body 1. With reference to FIGS. 9 and 10, to assemble the cover 3 to the shell body 1, the first fastening structure or bracket 31 is brought to align with the hook portion 217, after which the cover 3 is pressed toward the outer side 10 of the shell body 1. As the cover 3 gradually moves to the outer side 10 of the shell body 1, the movable plate portion 222 of the resilient component 22 is depressed by the cover 3 to move gradually toward the through hole 13 (see FIG. 8). Subsequently, the bracket 31 pushes against the inclined guiding face 218 of the hook portion 217, which in turn pulls the press portion 211 to move resiliently into the shell body 1 so as to be disposed in a depressed state. At this moment, the positioning studs 214 extends partially through the positioning notches 111 of the respective positioning plates 11, thereby compressing each compression spring 215 between the press portion body 213 and the corresponding positioning plate 11 to store a restoring force. As the bracket 31 continues pushing the inclined guiding face 218 until the hook portion 217 engages the engaging hole 311 of the bracket 31, with further reference to FIGS. 11 and 12, the compression springs 215 are released from being compressed, and the restoring forces thereof bias the press unit 21 to move back to its original position. Hence, assembly of the cover 3 to the shell body 1 is completed. At this time, the movable plate portion 222 of the resilient component 22 is compressed to store a restoring force.

Figure 4:
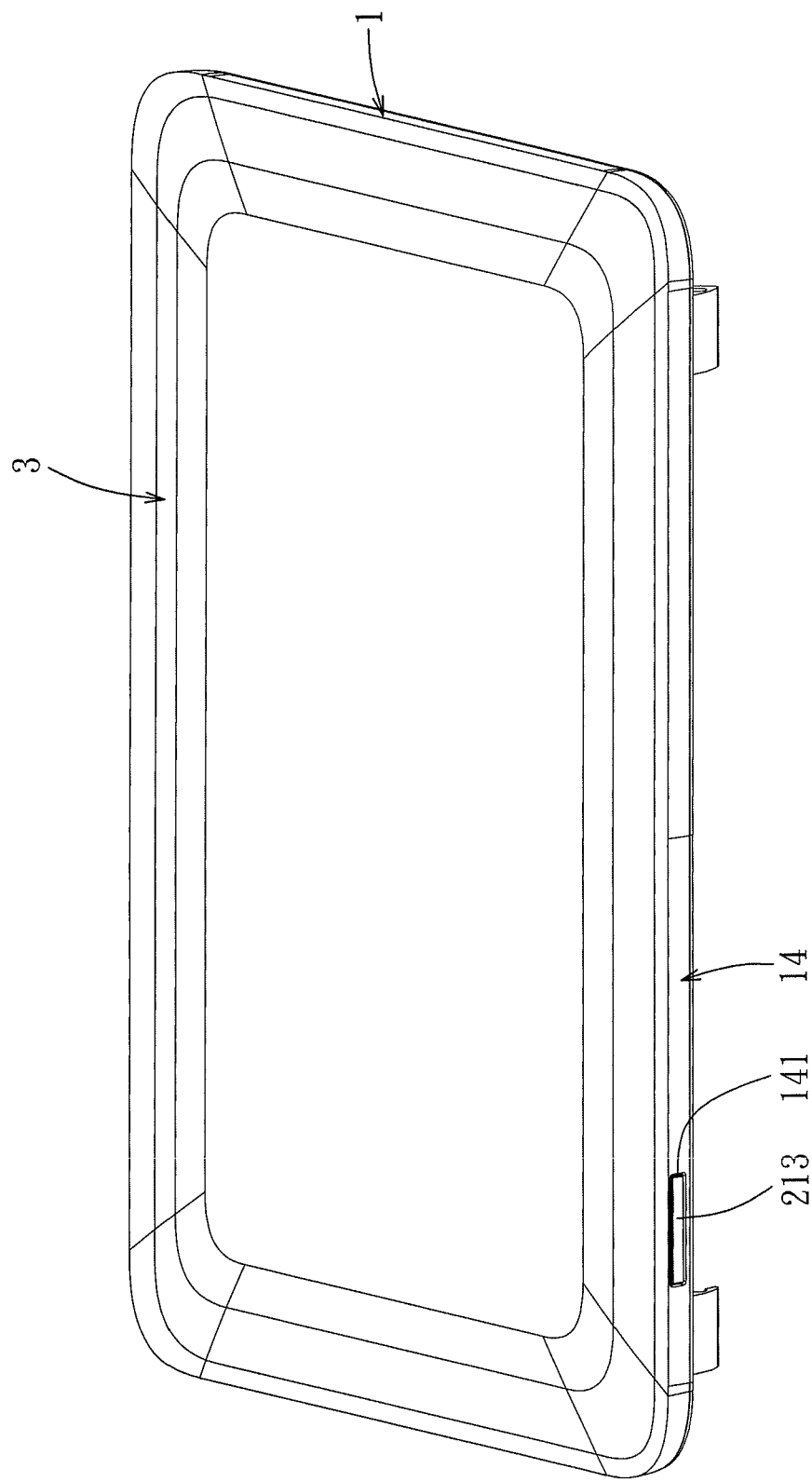
FIG. 4 is an assembled top perspective view of the embodiment.
Figure 5:
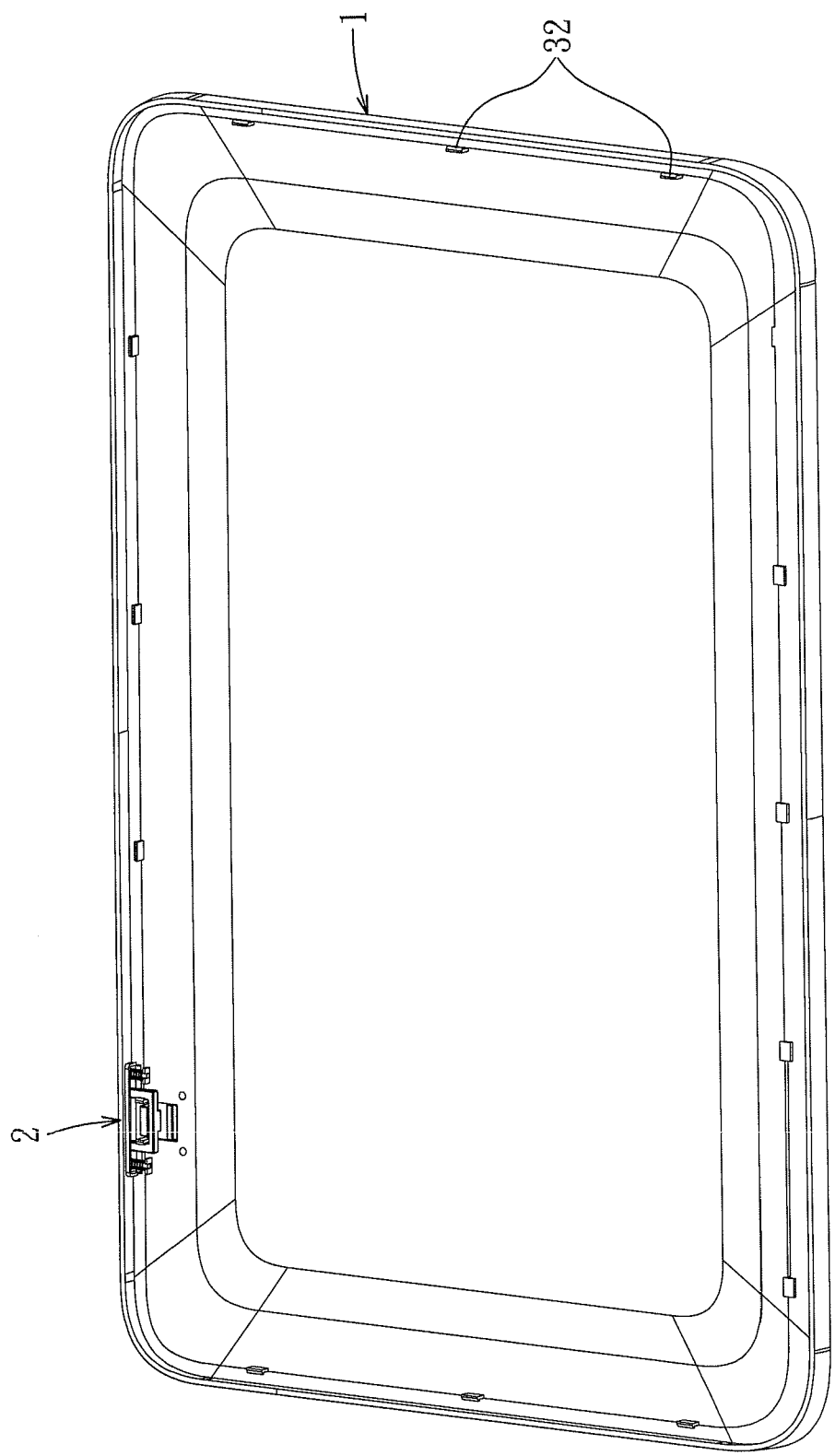
FIG. 5 is an assembled bottom perspective view of the embodiment.
Figure 13:
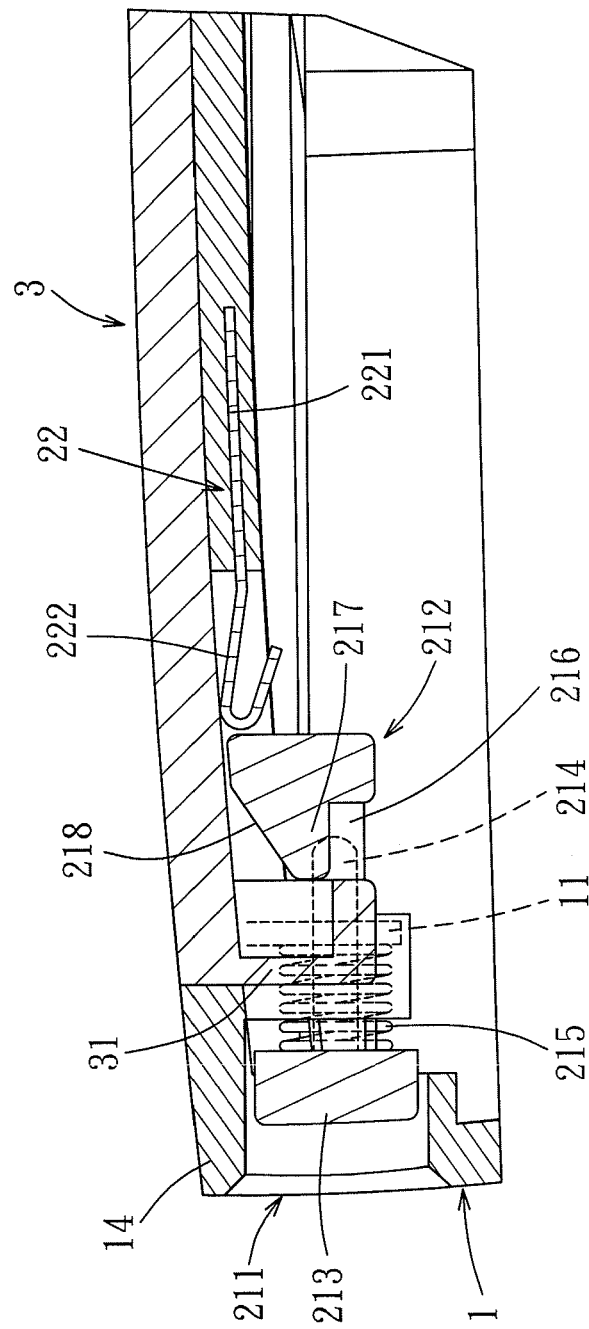
FIG. 13 is a view similar to FIG. 11, but illustrating a press portion of the press unit being pushed inwardly to move the hook portion away from the first fastening structure.

Referring to FIG. 13, in combination with FIGS. 1 and 4, to disassemble the cover 3 from the shell body 1, the press portion body 213 of the press portion 211 is pressed inwardly and resiliently into the shell body 1 to result in pushing the hook portion 217 away from the engaging hole 311 of the bracket 31, thereby disengaging the hook portion 217 from the engaging hole 311 of the bracket 31. Simultaneously, through the restoring force of the movable plate portion 222, the movable plate portion 222 biases the cover 3 to move away from the outer side 10 of the shell body 1. Hence, the cover 3 can be directly removed from the shell body 1.

In sum, this invention is designed with the press unit 21 to control assembly of the cover 3 to the shell body 1 and the resilient component 22 to assist disassembly of the cover 3 from the shell body 1 so as to resolve the drawbacks associated using the two-part structure of the conventional fastening mechanism. Further, by using the press unit 21 and the resilient component 22 of the fastening mechanism 2, the cover 3 can be directly installed on the shell body 1. To replace the cover 3, the press portion body 213 is simply depressed, thereby facilitating removal of the cover 3 from the shell body 1. Therefore, the objects of the present invention can be realized.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A fastening mechanism for an electronic device, the electronic device including a shell body and a cover detachably coupled to the shell body, the cover having a first fastening structure, said fastening mechanism comprising:

a press unit adapted to be provided on the shell body and including a press portion that is adapted to be exposed from the shell body and that is pressable to extend resiliently into the shell body to be disposed at a depressed state, and a second fastening structure fixed to said press portion, said second fastening structure being adapted to engage to the first fastening structure when the cover is coupled to the shell body to prevent removal of the cover from the shell body, and being adapted to disengage from the first fastening structure when said press portion is depressed to permit removal of the cover from the shell body; and a resilient component adapted to be provided in the shell body;

wherein said resilient component stores a restoring force when the cover is coupled to the shell body, and releases the restoring force when said second fastening structure is disengaged from the first fastening structure for biasing the cover away from the shell body; and wherein said resilient component is a resilient plate, and includes a fixed plate portion adapted to be fixed to the shell body, and a movable plate portion that is configured to be in direct contact with the cover when the cover is coupled to the shell body so as to be directly compressed by the cover for storing the restoring force and that is resiliently deformable relative to said fixed plate portion for directly biasing the cover away from the shell body.

2. The fastening mechanism as claimed in claim 1, wherein the first fastening structure is configured as a bracket defining an engaging hole, and wherein said second fastening structure includes a U-shaped connecting portion fixed to said press portion, and a hook portion located at the center of said connecting portion, said hook portion being adapted to engage the engaging hole when the cover is coupled to the shell body.

3. The fastening mechanism as claimed in claim 2, wherein said hook portion of said second fastening structure has an inclined guiding face adapted to face the cover, said inclined guiding face being adapted to be pushed by the first fastening structure when the cover is moved near the shell body so as to pull said press portion toward said depressed state.

4. The fastening mechanism as claimed in claim 2, wherein the shell body includes a positioning plate formed with a positioning notch, and wherein said press portion includes a press portion body adapted to be exposed from the shell body, a positioning stud extending from said press portion body into the positioning notch, and a compression spring sleeved on said positioning stud and disposed between said press portion body and the positioning plate to bias said press portion body away from the positioning plate.

5. The fastening mechanism as claimed in claim 4, wherein the shell body further includes a pair of limiting members located in said connecting portion, and wherein said press portion is adapted to be prevented by the limiting members from displacing in a direction perpendicular to a movement in the direction of said depressed state.

6. An electronic device comprising:

a shell body;

a cover openably closing said shell body and having a first fastening structure; and a fastening mechanism including a press unit provided on said shell body and including a press portion that is exposed from said shell body and that is pressable to extend resiliently into said shell body to be disposed at a depressed state, and a second fastening structure fixed to said press portion, said second fastening structure being engaged to said first fastening structure when said cover is coupled to said shell body to prevent removal of said cover from said shell body, and being disengaged from said first fastening structure when said press portion is depressed to permit removal of said cover from said shell body; and a resilient component provided in said shell body;

wherein said resilient component stores a restoring force when said cover is in a closing position to make said second fastening structure engage with said first fastening structure, and releases the restoring force to bias and push said cover to an opening position when said press portion is depressed to disengage said second fastening structure from said first fastening structure; and wherein said resilient component is a resilient plate, and includes a fixed plate portion fixed to said shell body, and a movable plate portion that is configured to be in direct contact with the cover when the cover is coupled to the shell body and that is resiliently deformable relative to said fixed plate portion to directly bias said cover away from said shell body.

7. The electronic device as claimed in claim 6, wherein said second fastening structure includes a U-shaped connecting portion fixed to said press portion, and a hook portion located at the center of said connecting portion, said first fastening structure being configured as a bracket defining an engaging hole, said hook portion being engaged to said engaging hole when said cover is coupled to said shell body.

8. The electronic device as claimed in claim 7, wherein said hook portion of said second fastening structure has an inclined guiding face facing said cover, said inclined guiding face being pushed by said first fastening structure when said cover is moved near said shell body so as to pull said press portion toward said depressed state.

9. The electronic device as claimed in claim 7, wherein said press portion includes a press portion body exposed from said shell body, a positioning stud extending from said press portion body into said shell body, and a compression spring sleeved on said positioning stud, said shell body including a positioning plate formed with a positioning notch, said positioning stud extending into said positioning notch, said compression spring being disposed between said press portion body and said positioning plate to bias said press portion body away from said positioning plate.

10. The electronic device as claimed in claim 9, wherein said shell body further includes a pair of limiting members located in said connecting portion, said limiting members preventing displacement of said connecting portion in a direction perpendicular to a movement in the direction of said depressed state.

11. The electronic device as claimed in claim 7, wherein said shell body further includes a through hole extending therethrough for allowing said first fastening structure to extend into said shell body through said through hole for engagement with said second fastening structure when said cover is in the closing position, said movable plate portion extending into said through hole and being bent relative to said fixed plate portion to normally and resiliently project out of said shell body and said through hole to bias said cover to the opening position, said cover compressing said movable plate portion when said cover is in the closing position.

12. The electronic device as claimed in claim 11, wherein said fixed plate portion is embedded in said shell body in proximity to said through hole.

\* \* \* \* \*